(12) United States Patent
Newman et al.

(10) Patent No.: US 11,386,611 B2
(45) Date of Patent: Jul. 12, 2022

(54) ASSISTED AUGMENTED REALITY

(71) Applicant: Skill Real Ltd, Ramat-Gan (IL)

(72) Inventors: Shai Newman, Rosh HaAyin (IL); Mor Zilberman, Ramat Gan (IL)

(73) Assignee: Skill Real Ltd, Ramat-Gan (IL)

( * ) Notice: Subject to any disclaimer, the term of this patent is extended or adjusted under 35 U.S.C. 154(b) by 0 days.

(21) Appl. No.: 16/327,929

(22) PCT Filed: Aug. 28, 2018

(86) PCT No.: PCT/IB2018/056544
§ 371 (c)(1),
(2) Date: Feb. 25, 2019

(87) PCT Pub. No.: WO2019/043568
PCT Pub. Date: Mar. 7, 2019

(65) Prior Publication Data
US 2021/0042992 A1   Feb. 11, 2021

Related U.S. Application Data

(60) Provisional application No. 62/551,868, filed on Aug. 30, 2017.

(51) Int. Cl.
*G06T 15/20* (2011.01)
*G06T 7/73* (2017.01)
*G02B 27/01* (2006.01)
*G06T 19/00* (2011.01)

(52) U.S. Cl.
CPC ........ *G06T 15/205* (2013.01); *G02B 27/0172* (2013.01); *G06T 7/73* (2017.01); *G06T 19/006* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 7,203,277 B2 * | 4/2007 | Birkenbach | A61B 6/032 378/205 |
| 7,463,823 B2 * | 12/2008 | Birkenbach | G03B 41/00 348/42 |
| 10,254,546 B2 * | 4/2019 | Poulos | G06F 3/0304 |

(Continued)

FOREIGN PATENT DOCUMENTS

WO   WO 2019/043568   3/2019

OTHER PUBLICATIONS

Anthes, Christoph, et al. "State of the art of virtual reality technology." 2016 IEEE Aerospace Conference. IEEE, 2016. (Year: 2016).*

(Continued)

*Primary Examiner* — Ryan M Gray

(57) ABSTRACT

An augmented reality system for viewing a static physical object includes a movable unit receiving signals from, a static tracking base station for obtaining the six-dimensional absolute position of the movable unit. The relative position of the movable unit relatively to the static physical object is calculated from the absolute positions of the movable unit and the static physical object. The relative unit-object position is then used for rendering and displaying an augmented image or projecting a virtual object on the static physical object.

5 Claims, 14 Drawing Sheets

(56) References Cited

U.S. PATENT DOCUMENTS

| | | | |
|---|---|---|---|
| 10,692,288 B1* | 6/2020 | Rasmussen | A63F 13/213 |
| 10,928,888 B2* | 2/2021 | Harvey | G06F 3/014 |
| 2004/0263535 A1* | 12/2004 | Birkenbach | A61B 6/4411 |
| | | | 345/629 |
| 2005/0201613 A1* | 9/2005 | Mostafavi | G01C 11/02 |
| | | | 382/154 |
| 2009/0109240 A1* | 4/2009 | Englert | G06T 7/73 |
| | | | 345/633 |
| 2012/0113141 A1 | 5/2012 | Zimmerman et al. | |
| 2015/0130801 A1* | 5/2015 | Wooley | G06F 3/04815 |
| | | | 345/420 |
| 2015/0287203 A1 | 10/2015 | Baumberg | |
| 2016/0098095 A1 | 4/2016 | Gonzalez-Banos et al. | |
| 2016/0227132 A1* | 8/2016 | Wooley | G06F 3/0202 |
| 2017/0085656 A1 | 2/2017 | Abbott et al. | |
| 2018/0185113 A1* | 7/2018 | Gregerson | A61B 6/032 |
| 2018/0217663 A1* | 8/2018 | Chandrasekhar | G06F 3/011 |
| 2019/0005733 A1* | 1/2019 | Wehner | G06F 3/038 |
| 2020/0410765 A1* | 12/2020 | Geissler | G06T 19/006 |

OTHER PUBLICATIONS

Medien, Audiovisuelle. "Implementation of a low cost marker based infrared optical tracking system." (2006).*

International Preliminary Report on Patentability dated Mar. 13, 2020 From the International Bureau of WIPO Re. Application No. PCT/IB2018/056544. (7 Pages).

International Search Report and the Written Opinion dated Dec. 4, 2018 From the International Searching Authority Re. Application No. PCT/IB2018/056544. (7 Pages).

Supplementary European Search Report and the European Search Opinion dated Apr. 30, 2021 From the European Patent Office Re. Application No. 18852429.2. (8 Pages).

Marchand et al. "Pose Estimation for Augmented Reality: A Hands-In Survey", IEEE Transactions on Visualization and Computer Graphics, XP055489389, 22(12): 2633-2651, Published Online Dec. 30, 2015.

* cited by examiner

ASSISTED AUGMENTED REALITY

BACKGROUND OF THE INVENTION

Field of the Invention

The present invention relates to computer-mediated reality, and in particular to augmented reality ("AR").

Description of Related Art

In augmented reality, a user uses an augmented reality viewer for viewing a real-world physical object augmented by computer-generated content and visuals such as text, graphics and/or animation.

A typical augmented reality viewer, such as a tablet computer or stereoscopic goggles, has a back camera that captures a real-time image of the viewed physical object, and uses the captured image for two purposes: (i) real-time analysis of the real-time image that calculates the relative position of the augmented reality viewer's camera with respect to the physical object, so that the computer-generated information and visuals are overlaid on that physical object in a relevant, realistic and/or pleasing manner, and (ii) in the case of non-goggles viewer, to capture an image of the physical object and its nearby physical environment. In the standard case of a non-goggles viewers the camera image and the overlaid computer-generated information/graphics are integrated and presented on a screen while in the standard case of goggles AR viewer only the computer-generated visuals are projected on semi-transparent screens in front of the users' eyes to overlay and augment the reality as seen by the user.

In some cases, the ability of an augmented reality viewer to derive the real-time relative position of the viewer with respect to the physical object is unsatisfactory, for example, because the viewed area does not contain sufficient visual features and cannot or is not allowed to be marked, or visual features may be occasionally occluded, such as by the user's hand that handles the physical object, or because lighting is insufficient or unstable or because no communication infrastructure is available to enable communication with a visually based tracking system.

The present disclosure teaches a system and method for augmented reality that enable operation of the AR viewer that does not rely on a camera of the augmented reality viewer nor on data communication with a tracking system for deriving the real-time relative position of an augmented reality viewer with respect to a physical object.

A BRIEF SUMMARY OF THE INVENTION

The present invention seeks to provide systems and functionalities for augmented reality that does not rely on camera(s) of an augmented reality viewer nor on data communication with a tracking system for deriving the real-time relative position of the augmented reality viewer with respect to a viewed physical object.

An "augmented reality viewer" (or "AR viewer") is an apparatus used by a user for viewing a physical object. It includes a screen or stereoscopic goggles that display an image, and a back camera that continuously captures an image of the physical object. A "physical object" is a real-world article that the user is viewing, for example for studying, training or guidance in manufacturing or using the object, or for entertainment. The back camera (or "camera") can be part of the AR viewer device or a standalone camera connected to the AR viewer device wirelessly or by wire.

Both the physical object and augmented reality viewer's camera are presumed to have a solid body, and therefore have a six-dimensional position in space, where "position" is definable by six coordinates, such as by three spatial and three angular coordinates within a world coordinate system, where "world coordinate system" is definable, in accordance to preferred embodiments of the present invention, by tracking system's frame of reference. It is assumed that at least the physical object or the augmented reality viewer's camera is movable by the user, thereby dynamically changing position, while, in some embodiments, one of them is static, i.e. has a fixed position is space, at least for the period of operation by the user. The physical object might have different states that might also change its physical appearance.

There is thus provided, in accordance to preferred embodiments of the present invention, an augmented reality system operative by a user for viewing a physical object, the system including an augmented reality viewer usable by the user; a tracking system enabling the AR viewer to autonomously calculate a six-dimensional absolute position, of at least one of the physical object or the augmented reality viewer's camera; and at least one processor, that may reside on the AR viewer, programmed to: (i) obtain a six-dimensional absolute position of the physical object, (ii) obtain a six-dimensional absolute position of the augmented reality viewer's camera, (iii) calculate, from the six-dimensional absolute position of the augmented reality viewer's camera and the six-dimensional absolute position of the physical object, a relative position of the augmented reality viewer's camera relatively to the physical object, (iv) retrieve a 3D model of virtual objects and/or other computer generated visuals for augmenting the physical object, render an image of the physical object augmented by the virtual objects and/or other computer generated visuals according to the relative position of the augmented reality viewer's camera relatively to the physical object, and (v) provide the image to the augmented reality viewer for viewing by the user. Optionally, the AR image may be transmitted to a remote location, to be viewed by a person, who may also remotely-operate the camera for dynamic AR experience In case the AR viewer is a goggle pair, then rendering the image of the physical object and/or environment from the camera feed is not needed and only the virtual objects and other computer-generated images are rendered and presented on the goggles accordingly. Also in such a case, the six-dimensional approximate absolute position of each of the user's eyes, and not the position of the camera, is calculated in order to then calculate a relative position of each of the eyes relatively to the physical object enabling to render the right 3D model and other computed generated graphics to be projected on each of the goggles' displays, one for each eye, accordingly.

In a case that the physical object is static and the augmented reality viewer is movable by the user, the tracking system may include a static tracking base station of type lighthouse and a tracker, that contains an array of sensors that can detect the signals sent from the tracking base station. The tracker is attached to the augmented reality viewer, or its camera in case of AR viewer using an external camera, in a way that enable the AR viewer to use the signals from the base station, as well as other sensors, for example accelerometers, to autonomously calculate a six-dimensional position within the world coordinates system. In this invention, the tracking base station is active, for example of a lighthouse type, and not camera based, thus enabling the AR viewer to use the tracker data to autonomously calculate its camera's six-dimensional position within the world coordinate system, based on the base station signals detected by sensors on the tracker, that is attached to the AR viewer or to the stand alone camera, without the need for additional inputs or communication. In this case, the augmented reality viewer and the tracking system may be further operative to obtain the six-dimensional absolute position of the physical object, for example by the following method: for this example it is assumed that the physical object has a "digital tween" which is a 3D model that its surface accurately matches the physical object. At least 3 exact physical non-collinear points are defined on the surface of 3D model which are used as "anchors". For each of the anchors: (i) on the AR viewer screen, the user is presented with a marking of current anchor point on the 3D model surface as well as with the camera feed, (ii) user is requested to include the anchor point of the physical object within the camera's field of view and touch the AR viewer screen on the exact point in which he sees the currently marked anchor point within the camera feed, (iii) the user is then requested to move and bring again the currently marked anchor point within the camera field of view, this time from a different angle, and then touch the screen again on the exact point in which the user sees the currently marked anchor point within the camera feed, (iv) as the absolute positions of the camera as well as the exact touching point coordinates of the user on the camera feed presented on screen, in both iterations, are known, lines toward the anchor point from the absolute positions of the camera within the world coordinates, can be calculated. The angle of the line toward the physical anchor point relative to the perpendicular of the camera's lens, can be calculated, for example, based on the ratio of the touching coordinates on camera feed screen's distance from the camera feed screen's center and the camera's known field of view, (v) calculate the two closest points, one on each of the above two skew lines, and use the point in the center of the line connecting these two closest points as approximation of the absolute position in space of the current anchor point. This calculation is based on the fact that the closest two points are perpendicular to both skew lines.

Repeat the above calculation for each of the anchor points. Once these 3 anchors' positions are calculated they enable to place the 3D "digital tween" model and hence the equivalent physical object's six-dimensional position in space, within the world coordinates of the tracking system. The calculation can be done, for example, by placing the model with one of the anchor points and then rotating the virtual object on the right axis until all anchor points are approximately aligned. If the alignment is not accurate enough the user might be requested to supply more samplings of the anchor points in the method described above. Once the six-dimensional position of the physical object is calculated, an additional tracker may be attached to the physical object or to other object that is attached to the physical object, and identify changes in physical object six-dimensional position enabling the physical object to move while keeping the ability of the AR viewer to supply the augmented layers.

Alternatively, the augmented reality viewer and the tracking system may be further operative to obtain the six-dimensional absolute position of the physical object by obtaining the absolute location of the above-mentioned anchor points in different ways. For example, adjusting a physical rod of a known length, in a known location and orientation, on the tracker of the tracking system, so that the exact position of the rod edge is continuously known. Then, present on the AR viewer screen a marking of a current anchor point on the 3D model surface; then the user is requested to touch with the edge of the above rod on the current marked anchor point on the actual physical surface of the physical object and touch the screen, or enter another signal, or just wait until the system is stabilized and signal it, to enable the calculation of the three-dimensional location of this anchor point within the tracking system's world coordinates. Once the three anchor points are positioned, the physical object's six-dimensional position in space within the tracking system's world coordinate can be calculated in various methods, including the method described above.

In the case that the augmented reality viewer's camera is static and the physical object is movable by the user, the tracking system may include a static tracking base and a tracker that is attached, in a known exact six-dimensional position, to the physical object instead to the AR viewer or the camera and communicates with the AR viewer by wire or wirelessly, enabling tracker and hence physical object six-dimensional position autonomous calculation by the AR viewer. In this case, the augmented reality viewer may be further operative to obtain the six-dimensional absolute position of the augmented reality viewer's camera by reversing the above process and moving the physical object instead of the AR viewer, identifying the tracker position on screen within the camera feed, and adjust calculations accordingly; or alternatively using the tracker attached to the physical object to pinpoint anchor points on the AR viewer (one of them is preferably the back camera) or on the camera's container case (in case of an external camera), one of the anchor points is preferably the camera to calculate six-dimensional position of the AR viewer's camera within the tracking system's world coordinates.

In the case that both the augmented reality viewer and the physical object are movable, the tracking system may include a static tracking base, an object tracker that is attached to the physical object in exact know six-dimensional location, and use the tracking base signals for positioning also the tracker that is attached to the augmented reality viewer.

Computing associated with the operation of the system may be executed by a microprocessor of the augmented reality viewer and possibly supplemented also by processors of other computing devices suitable for real-time computing. The tracker may be custom made or an off the shelf tracker that is sold together with a base tracking lighthouse station.

According to aspects of the present disclosure, there is provided an augmented reality system that includes a static tracking base station for sending signals and a movable unit operable by a user for augmenting a static physical object. The movable unit includes a tracker for receiving signals sent by the static tracking base station, a camera for capturing a real-time image of the static physical object, a viewer for displaying an augmented image of the static physical object, and at least one processor programmed to: (i) obtain a six-dimensional absolute position of the static physical object, (ii) calculate, from the signals received by the tracker, a six-dimensional absolute position of the camera, (iii) calculate, from the six-dimensional absolute position of the camera and the six-dimensional absolute position of the static physical object, a relative position of the camera relatively to the static physical object, (iv) receive a model of a virtual object for augmenting the static physical object, (v) render an image of the static physical object received from the camera augmented by the virtual object according to the relative position of the camera relatively to the static physical object, and (vi) display the rendered image on the viewer. The viewer may include a screen or wearable augmented reality goggles. In the above augmented reality system the static tracking base station may include at least one lighthouse. Furthermore, in the above augmented reality system obtaining a six-dimensional absolute position of the static physical object may include receiving and processing user inputs.

According to other aspects, there is provided an augmented reality system that includes a static tracking base station for sending signals and a movable unit operable by a user for augmenting a static physical object, the movable unit including: a tracker for receiving signals sent by the static tracking base station, a projector for projecting on the static physical object, and at least one processor programmed to: (i) obtain a six-dimensional absolute position of the static physical object, (ii) calculate, from the signals received by the tracker, a six-dimensional absolute position of the projector, (iii) calculate, from the six-dimensional absolute position of the projector and the six-dimensional absolute position of the static physical object, a relative position of the projector relatively to the static physical object, (iv) receive a model of a virtual object for projection on the static physical object, (v) render an image of the virtual object according to the relative position of the projector relatively to the static physical object, and (vi) project the rendered image on the static physical object. The static tracking base station may include at least one lighthouse. Also, obtaining a six-dimensional absolute position of the static physical object may include receiving and processing user inputs.

According to other aspects, there is provided an augmented reality method that includes: obtaining a six-dimensional absolute position of a static physical object; receiving in a movable unit that includes a projector signals from a static tracking base station; calculating from the received signals a six-dimensional absolute position of the projector; calculating, from the six-dimensional absolute position of the projector and the obtained six-dimensional absolute position of the static physical object, a relative position of the projector relatively to the static physical object; receiving a model of a virtual object for projection on the static physical object; rendering an image of the virtual object according to the relative position of the projector relatively to the static physical object; and projecting the rendered image on the static physical object. In the above augmented reality method, the obtaining a six-dimensional absolute position of the static physical object may include receiving and processing user inputs.

BRIEF DESCRIPTION OF THE SEVERAL VIEWS OF THE DRAWINGS

FIG. 1A illustrates a physical object, FIG. 1B illustrates a tablet computer held by a user facing the physical object, and FIG. 1C illustrates a view of the physical object as seen on the tablet computer;

DETAILED DESCRIPTION OF PREFERRED EMBODIMENTS OF THE INVENTION

Summary of Background Art

Augmented Reality

Figure 1A:
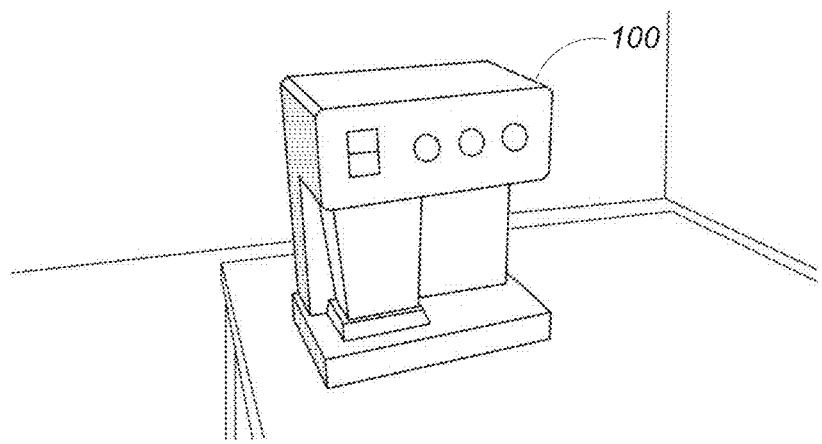
FIGS. 1A-1C illustrate the concept of augmented reality, where
Figure 1B:
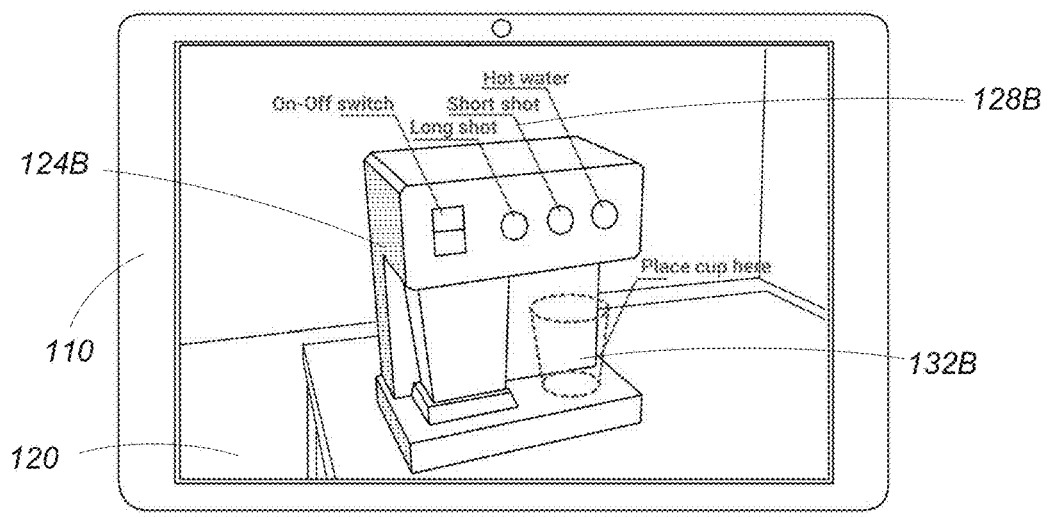
Figure 1C:
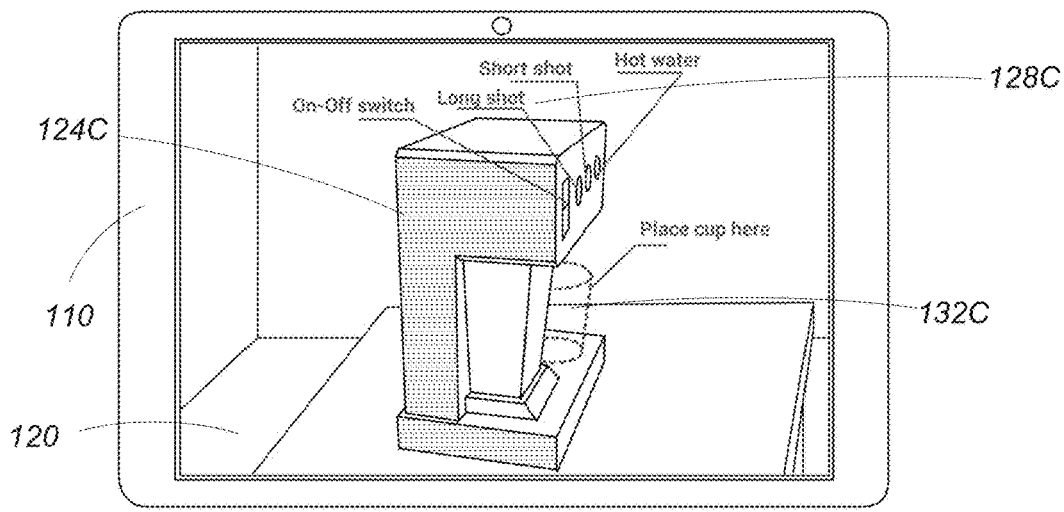

FIGS. 1A-1C illustrate the concept of augmented reality. FIG. 1A illustrates a physical object, such as a coffee machine 100 that has several buttons and a base for placing a cup. An imaginary unexperienced user may not be familiar with the functions of the buttons and the role of the base, and augmented reality is called for acquainting the user with coffee machine 100.

FIG. 1B illustrates a tablet computer 110 that is held by the user facing the coffee machine 100 of FIG. 1A. The tablet computer 110 has a back camera (not shown) that captures the current image of the coffee machine, and a processor (not shown) that displays on screen 120 a coffee machine picture 124B as captured by the camera. The processor further augments the displayed picture by adding pointers and text 128B that describe the functions of the buttons, and a cup dummy 132B drawn with dashed lines, supplemented by a pointer and text, to demonstrate where a cup is to be placed.

The user now moves the tablet computer 110 to his left, and the picture on the screen then changes according to the new viewpoint and perspective, as shown in FIG. 1C. Coffee machine picture 124C is as currently captured by the back camera of tablet computer 110, while the augmented reality layer, composed of pointers and text 128C and cup dummy 132C, is automatically adjusted according to the current relative six-dimensional position of the tablet computer's camera with respect to the coffee machine. As known in the art of augmented reality, the relative position of the camera (not shown) of tablet computer 110 relatively to the coffee machine is customarily analyzed by the processor of tablet computer 110 through image processing of the captured image, by identifying and analyzing the current bitmap location of selected visual features of the coffee machine within the captured image.

The present art of augmented reality thus includes knowledge, algorithms and software libraries for: (a) entering a model of the augmented reality layer the added pointers, text and cup dummy in the present example); (b) deriving the relative position of the augmented reality viewer with respected to the viewed object, and (c) rendering an augmented picture, that shows the currently-captured image overlaid by the augmented reality layer, so that the elements of the augmented reality layer (in the current example:

pointers, text and the cup dummy) appear in a relevant (e.g. pointing at the proper button), realistic (cup dummy presented as a three-dimensional object from all perspectives) and pleasing (e.g. text preferably displayed in free spaces) manner.

Non-Visual Tracking Systems

In the present context, a "non-visual tracking system" is a system that determines the position of an object without relying on cameras and image processing. Of special interest are systems that have a static tracking base of one or more tracking stations, used as lighthouses to send signals that are captured by the sensors on the trackers attached to movable objects of interest, to enable autonomous calculation that accurately determine the current absolute position of each movable object. The term "static" relates to elements presumed to stay at the same position throughout the tracking operation, while "movable" relates to elements that are expected to be moved by the user and require tracking in order to obtain their current position.

Figure 2A:
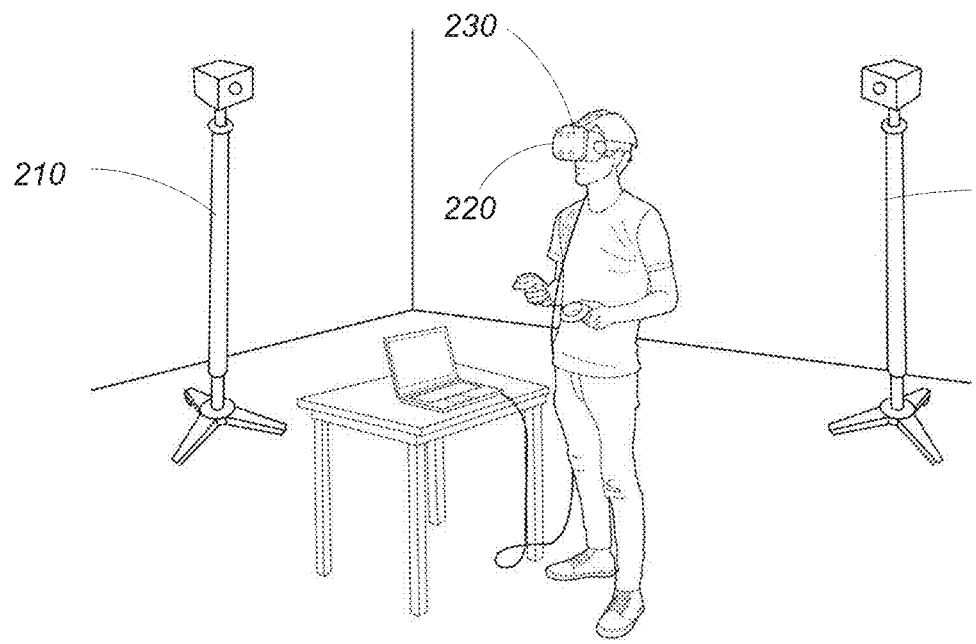
FIGS. 2A-2B illustrate tracking systems including base stations.

FIG. 2A depicts a standard use case in which the base stations 210 are used as lighthouses for sending synchronized signals that are captured by the sensors 230 that enable to position the virtual reality headset 220 in all six dimensions. A system that use similar technology is HTC VIVE one of the most common VR headset in the world as of 2017 with millions of users that is manufactured by the HTC company originated from Taiwan. There are other common systems (not shown) that are visually based and use cameras to track visual trackers attached to moveable objects to enable to calculate and then communicate the position of those moveable objects. In such visually based systems there must be a data communication between the tracking system and the AR viewer and thus can't enable autonomous calculation of position by, for example, the AR viewer. The sensors that identify the lighthouse signals can be also integrated into a "tracker" device that its position is calculated based on the signals the sensors received from the lighthouse.

Figure 2B:
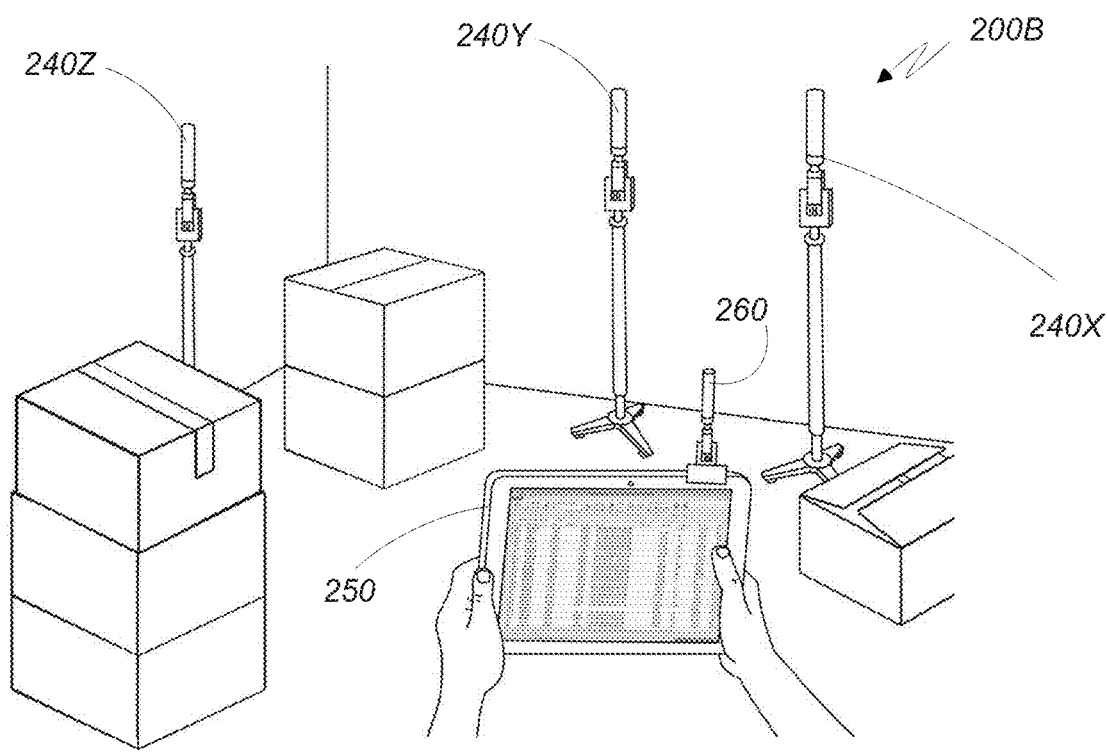

FIG. 2B depicts another type of tracking system. In this case the base stations (240Z, 240Y, 240X) send RF signals, for example in MB frequency, that are picked by the system tracker 260 that its position is then calculated based on the signals received from the base stations. In this case the tracking system is used for supplying location based information presented on tablet 250. Systems based on this technologies supplied for example by Ciholas Inc. from 3700 Bell Road, Newburgh, Ind. 47630. Such systems are not visual and enable autonomous calculation of position, but they are usually not accurate enough for high quality AR and require more sensors for calculation of orientation.

A System with a Static Physical Object and a Movable Viewer

System Layout

Figure 3A:
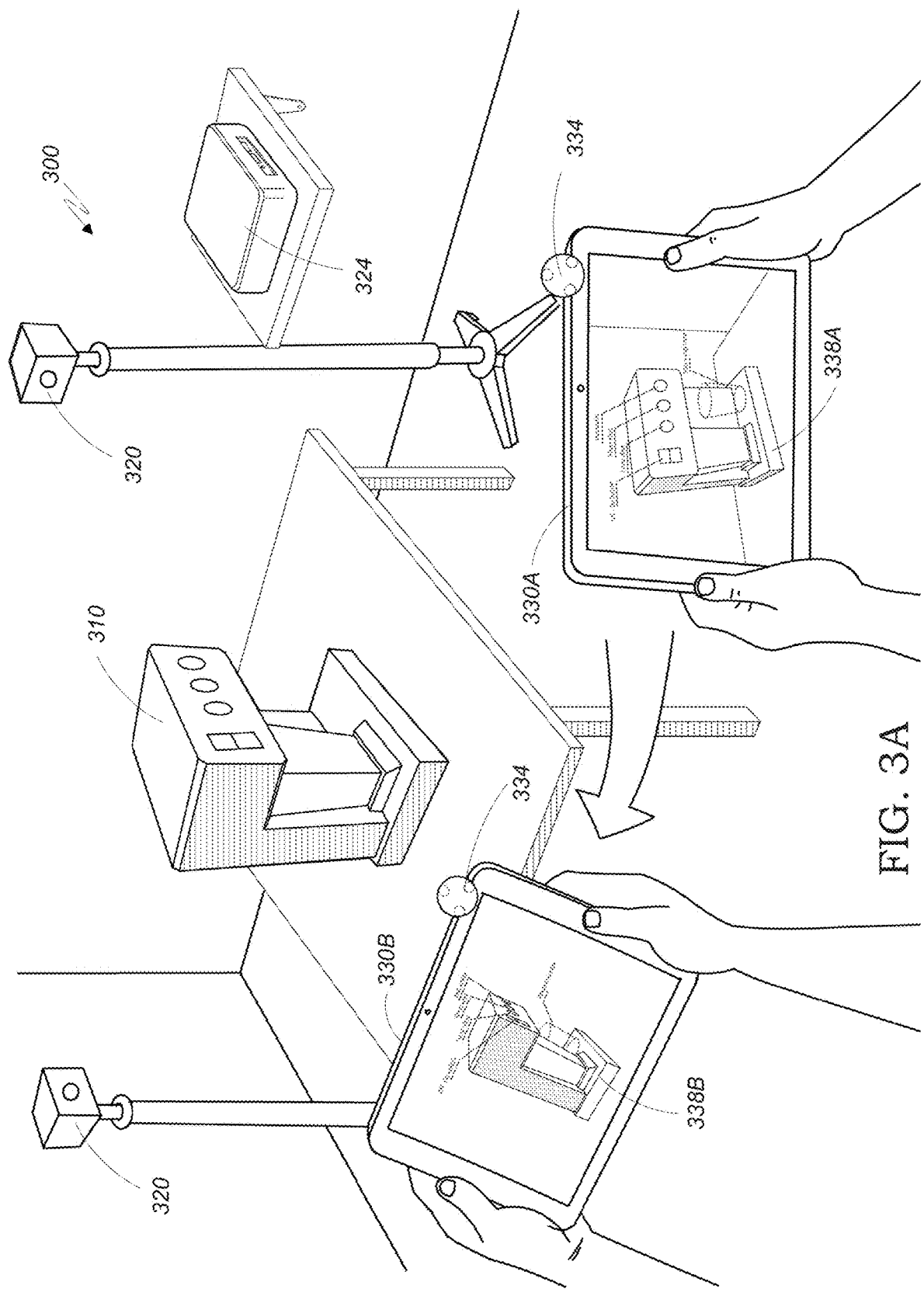
FIGS. 3A illustrates a static physical object viewed using a movable augmented reality viewer.

FIG. 3A is a pictorial illustration of scenario 300, where a physical object 310 is embodies as a coffee machine. Physical object 310 is static, i.e. is presumed to stay at the same position throughout the operation of the embodiment of scenario 300. The user holds augmented reality viewer, such as a tablet computer, at a first position 330A, and views a camera feed image 338A that shows physical object 310 as currently captured by the back camera (not shown) of the augmented reality viewer, augmented by text and graphics, similarly to the teachings of FIG. 1B, except that the relative position of augmented reality viewer's camera at first position 330A, relatively to the physical object 310, is not determined by image processing of picture 338A or other image processing, but rather by autonomously calculating the back camera (not shown) position using the tracker 334 attached to the augmented reality viewer that uses signals from the static tracking base 320, as further elaborated with reference to FIG. 3B below.

Figure 3B:
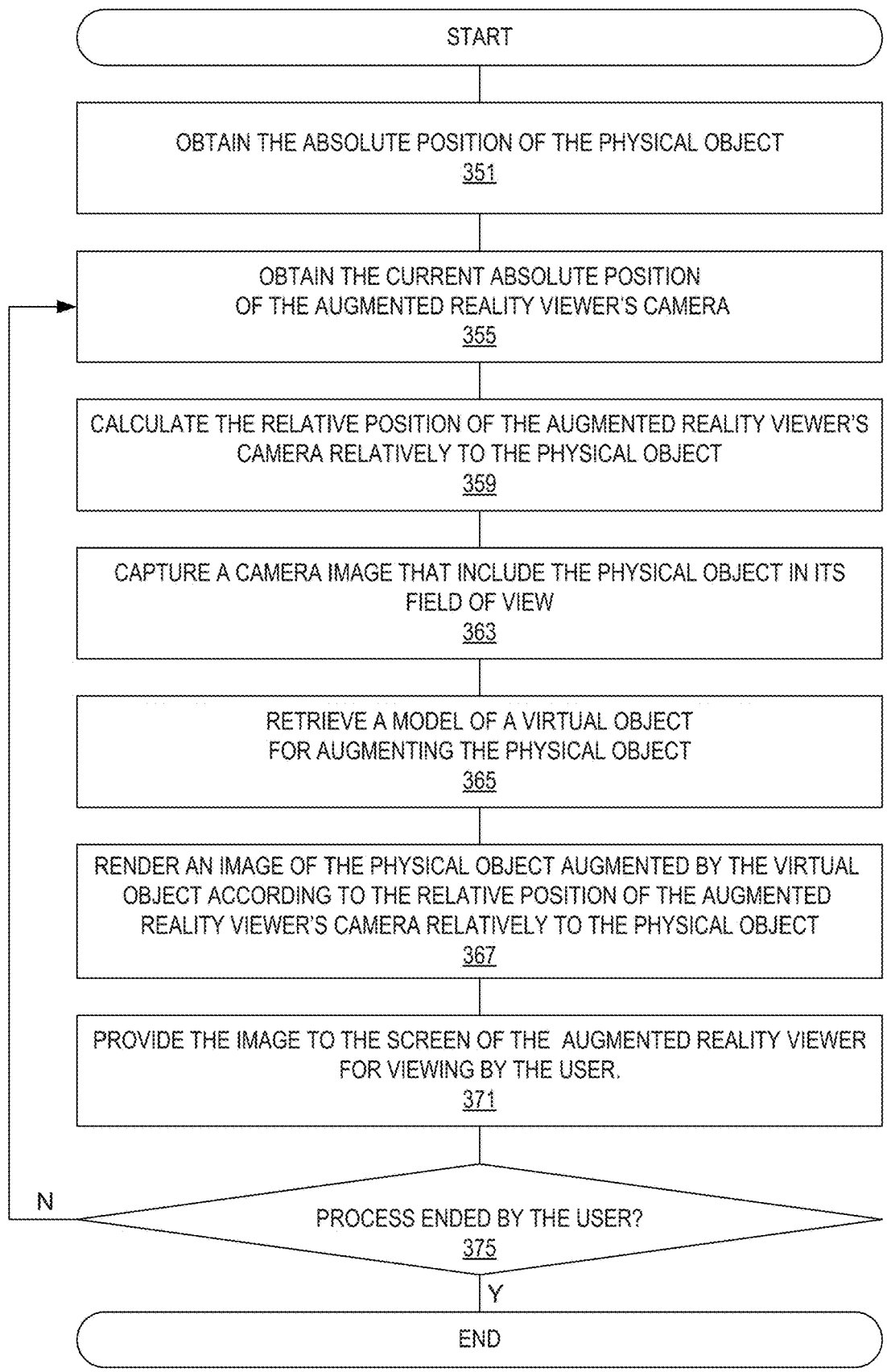
FIG. 3B is a flowchart of operation of the system of FIG. 3A.

The user then moves the augmented reality viewer to a second position 330B, which causes camera teed picture 338B to show physical object 310 as currently captured by the back camera of the augmented reality viewer, augmented by text and graphics, similarly to the teachings of FIG. 1C, except that the relative position of augmented reality viewer at second position 330B, relatively to the physical object 310, is not determined by image processing of picture 338B, but rather by autonomously calculating the back camera (not shown) position using the tracker 334 attached to the augmented reality viewer, that uses signals from the static tracking base 320, as further elaborated with reference to FIG. 3B below.

Scenario 300 involves continuous computing of absolute and relative positions based on tracking signals sent by one or more of tracking station 320. Only the tracking base stations 320 send signals that are captured by the sensors on the tracker 334. Such computing may be made by the processor of the augmented reality viewer.

Operation

The following operation is performed by processors of the augmented reality viewer and/or processors of other computers optionally added to support real-time computing.

FIG. 3B depicts the system operation under scenario 300 of FIG. 3A, where physical object 310 is at a fixed position. In step 351, the position of physical object 310 is obtained, for example by one of three methods: (a) since physical object 310 is static, its position may have been previously determined and recorded, and now just retrieved from memory; (h) any conventional position measurement system is employed for measuring the position of physical object 310; or (c) a method such as of FIGS. 4A-4E is used. In step 355, tracker 334 and tracking base 320 of FIG. 3A and a processor are used to obtain the current absolute position of the augmented reality viewer's camera, for example according to the background art teachings of FIG. 2A or 2B while taking into consideration the six-dimensional offset between the AR viewer's camera (not shown) and the tracker 334. In step 359, the absolute position of the physical object obtained in step 351 and the absolute position of the augmented reality viewer obtained in step 355 are used to determine the relative six-dimensional position of the augmented reality viewer's camera relatively to the physical object. In step 363, the camera of the augmented reality viewer captures an image with the physical object within its field of view. In step 365, a model of a virtual object, such as the pointers, text and three-dimensional cup model of FIGS. 2B+2C, is retrieved from memory, and step 367 renders an image of the physical object, augmented by the virtual object rendered according to the current relative position of the augmented reality viewer's camera relatively to the physical object as also discussed with reference to FIGS. 1A-1C. Such virtual object rendering is made by methods known in the art of augmented reality, for example by using 3D engines like Unity3D that enable for example to place the virtual objects and the virtual camera in their above obtained six-dimensional positions which are within the same coordinates world and then capture the image rendered by the virtual camera. For this to enable accurate AR the virtual camera should also use the same projection matrix as of the AR viewer's camera. In step 371, the image rendered in step 367 is provided to the screen of the augmented reality viewer for viewing by the user. If the user continues to operate the viewer, possibly moving it, such as from position 330A to position 330B in FIG. 3A, then step 375 sends the process back to step 355 to obtain the current absolute position of the augmented reality viewer and provide another picture from the current perspective in step 371.

Determining the Absolute Position of the Static Object

Figure 4A:
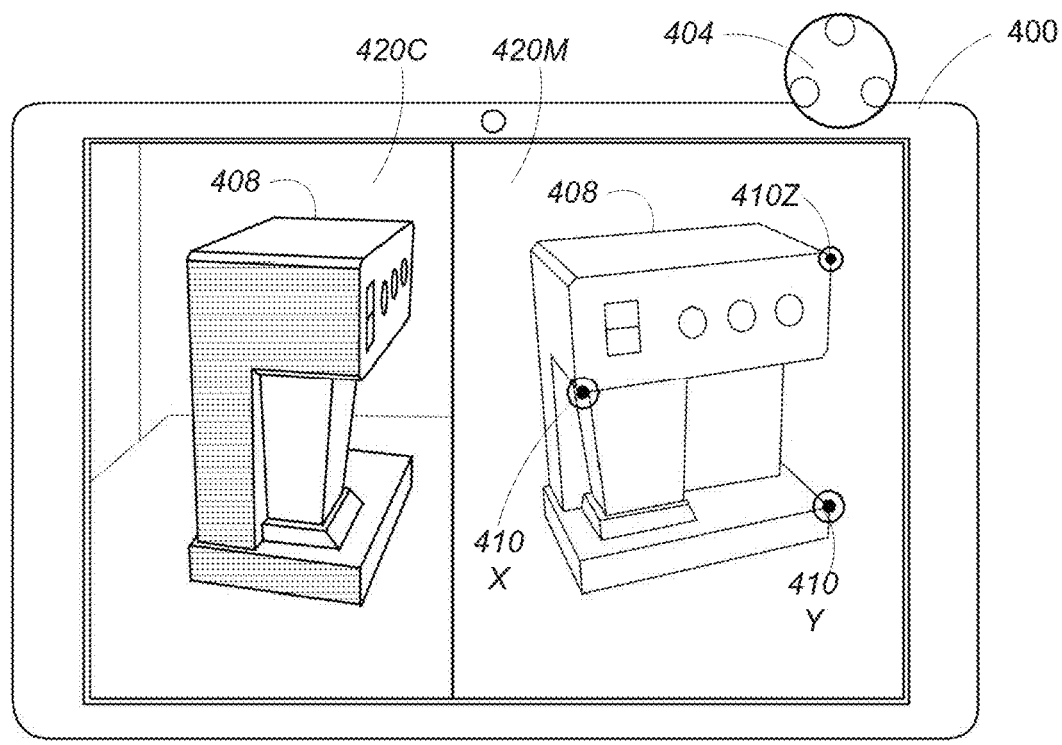
FIGS. 4A-4B illustrate a tracking system used to obtain an absolute position of a physical object.
Figure 4B:
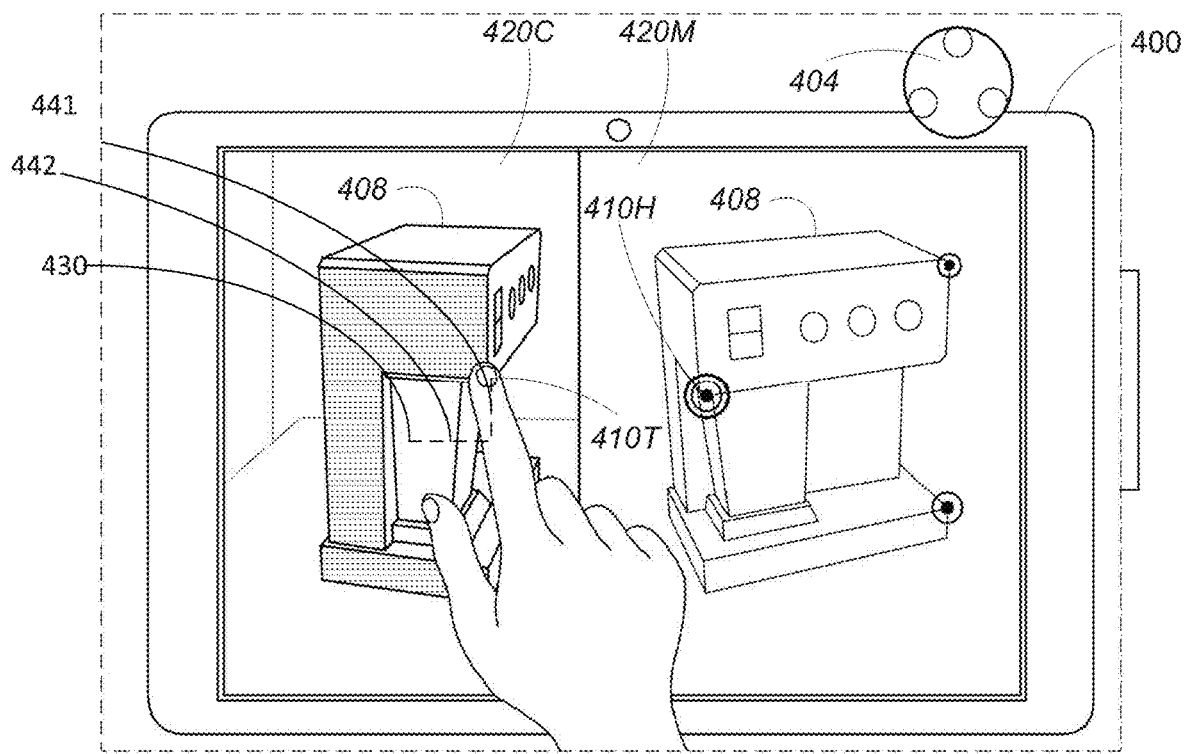
Figure 4C:
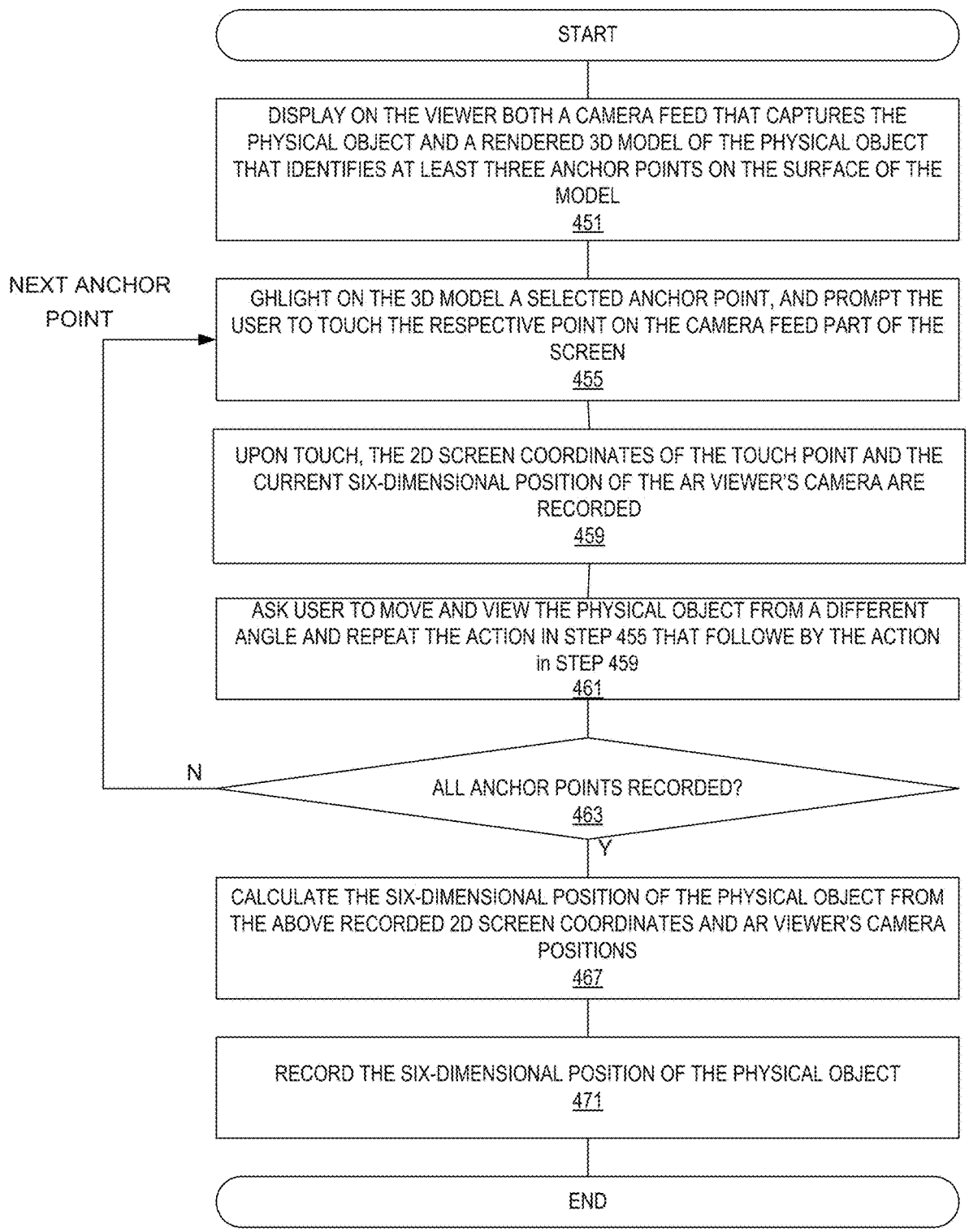
FIG. 4C is a flowchart of operation of the system of FIGS. 4A-4B to obtain the absolute position of the physical object.

FIGS. 4A-4C describe processes of using a setup like of FIG. 3A for obtaining the absolute position of physical object 310 in step 351 of FIG. 3B.

FIG. 4A depict an AR viewer, in this case tablet 400 with a back camera (not shown) and a tracker 404 that enables to determine the back camera (not shown) position. The screen is divided into two parts: on the left side the camera feed 420C supplied by the back camera (not shown) showing a view of a physical coffee machine and, on the right a computer generated graphics 420M in which you see the rendered image 408 of the 3D model of the same coffee machine type. On the surface of the virtual 3D model 408 three non-collinear anchor points (410X, 410Y, 410Z) are defined and marked.

In FIG. 4B, the user is asked to touch the screen on the camera feed section 420C on the exact location 410T where he identifies anchor point 410H. The user is touching the screen on point 410T and then asked to move and view the anchor point on the physical object (coffee machine) from a different angle and repeat the process. The above actions are then repeated for each anchor point. The X and Y pixel coordinates of the touching point 410T, within the camera feed 420C frame, are subtracted by the X and Y pixel coordinates of the camera feed 420C frame center 430 to yield delta X 442 and delta Y 441 (that can be plus or minus) that are then divided by the pixel width and pixel length, accordingly, of the camera feed 420C frame to set the ratio that when multiplied by the field of view of the back camera (not shown), define the relative angle of the line from the back camera toward the physical anchor point on the physical object, to the perpendicular of the camera lens. Then, as the six-dimensional position of the back camera (not shown) can be calculated based on the tracker 404 six-dimensional position, using the pre-define six-dimensional offset between them, the perpendicular and then the line from camera lens toward the anchor point on the physical object can be derived.

This use case assumes that an accurate enough 3D model of the physical object exists. Step 451 displays on the viewer both a camera feed with the physical object within its field of view and on the other part of the screen presents a rendered 3D model of the physical object on which at least 3 anchor non-collinear points can be clearly identified on the surface of the model.

In step 455 the current anchor point is highlighted on the 3D model, and the user is prompted to touch the respective point, where he sees the equivalent anchor point on the physical object, on the camera feed part of the screen.

Once the user touched the screen the 2D screen coordinates of the indicated point are recorded together with the current six-dimensional position of the AR viewer's camera as derived from the current tracker position that is in a known six-dimensional offset from the AR viewer's camera (step 459). Note that the point on screen can also be indicated by other methods and not only by touch, for example by a mouse.

In step 461 the user is asked to move and view the physical object from a different angel and repeat the action in step 455. The 2D coordinates of the new touch point and the current position of the AR viewer's camera are recorded as in step 459.

Step 463 checks whether all anchor points are recorded at least from two different angels and if yes, continues to the next step and if not steps 455 to 463 are repeated for the next encore point.

Step 467 calculates the six-dimensional position of the physical object from the recorded 2D screen coordinates and AR viewer's camera positions as described below.

Each recorded "touch" defines a line from the recorded camera's absolute position toward the anchor point in the physical world. This is enabled as the six-dimensional position of the camera is known, and together with the ratios of the recorded touch point 2D coordinates on the screen to the known 2D coordinates of the camera feed on the screen, and together with the known camera's field of view—enable to calculate the direction of the line. More detailed teaching is added as part of the description of FIG. 4B.

For each anchor point at least two lines are calculated as described above enabling to define two skew lines associated with this anchor point. Then the two closest points on the skew lines are calculated and the point that is at the center of the line connecting these two closest points is defined as the approximation of the anchor point actual position in the physical space. All coordinates are according to the tracking system's world coordinates. This process can further be repeated for improving accuracy. Once at least three anchor points position are calculated, they enable to place the 3D model of the physical object and hence the equivalent physical object's six-dimensional position in space, within the world coordinates of the tracking system. The calculation can be done in several known methods, for example, using iterative rotation by placing the 3D model of the physical object with one of the anchor points already aligned to this anchor point's approximate previously calculated position in the tracking system coordinates' world and then rotate the 3D model around the three world coordinate axis (X, Y, Z) using anchor point 1 as a pivot, axis by axis, for each axis stop rotating when anchor point 2 on the virtual model is closest to the anchor point 2 physical approximate location. At the end of this process both anchor point 1 and 2 are placed close to their physical location as calculated before within the tracking system's coordinates world. Then, use the axis of the line connecting anchor point 1 and 2 and rotate the model around it until anchor point 3 on the model is closest to its physical coordinates. If the alignment is not accurate enough the user may also be requested to supply more samplings of the anchor points on the physical object in one of the methods described. Another standard method to calculate the physical object location from known anchor point position can use SVD decomposition. In step 471 the calculated six-dimensional position of the physical object is recorded in order to enable the AR.

An alternative method to calculate physical object position without anchor points is to ask the user to ensure that the physical object is seen within the camera feed and present the 3D virtual model of the physical object in front of the user at arbitrary position as an AR layer and then let the user to move and rotate the object on all dimensions until the 3D model virtual graphics co-aligned with the physical object. Once they are co-aligned the physical object position is actually the same as of the virtual object position as they are manipulated in the same world coordinates and the virtual camera is positioned in the position of the real camera. A similar method can also be used if only one or two anchor points are known. In such a case the user can manipulate the virtual 3D model of the physical object by rotating it until visually aligned to the physical object using the one point as an anchor point or around an axis in case of two anchor points.

Once the six-dimensional position of the physical object is calculated, a tracker might be attached to the physical object or any other object that is attached to it in a solid way, like a cradle on which the physical object lies, and thus identify changes in the physical object's six-dimensional position enabling the physical object to move while knowing its physical location, keeping the ability of the AR viewer to work and supply the augmented layers.

Figure 4D:
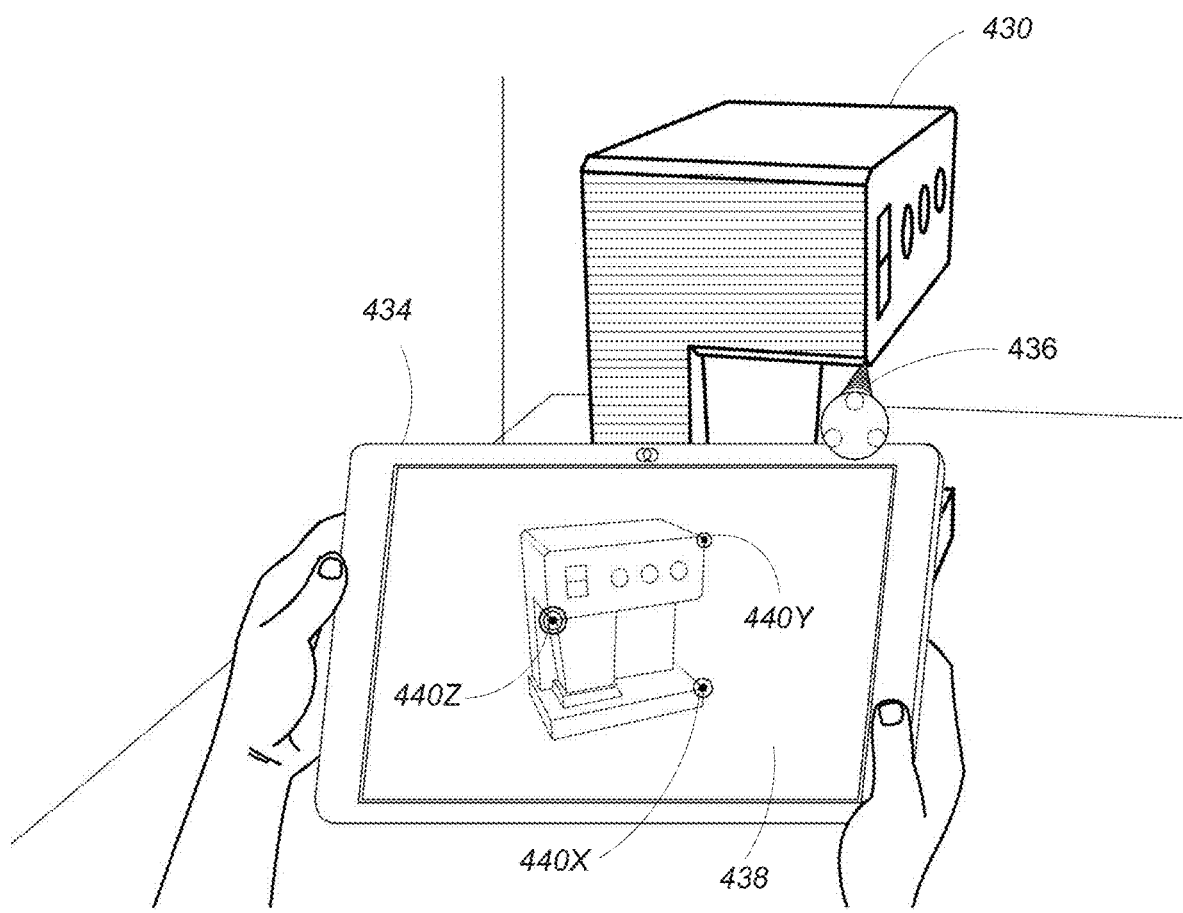
FIG. 4D illustrates another system of defining a location of an object in 3D space.
Figure 4E:
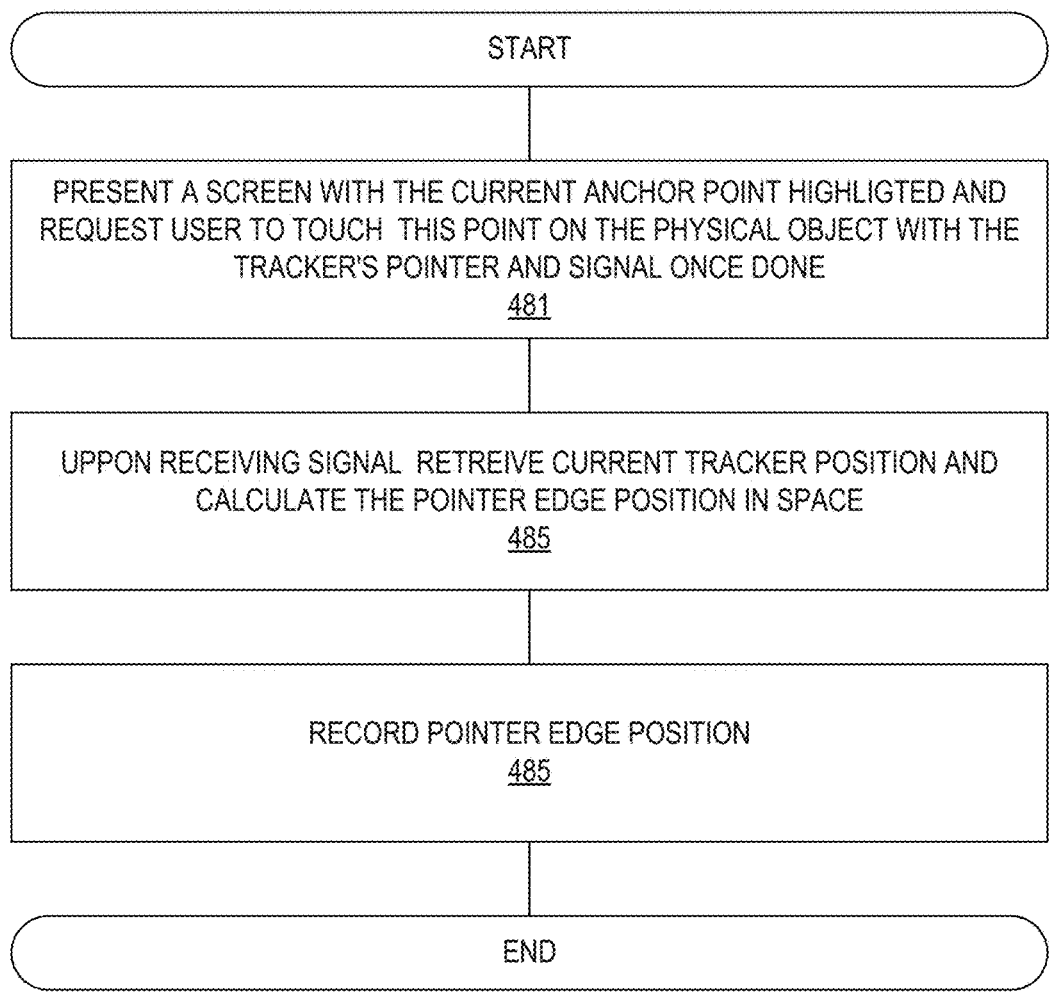
FIG. 4E is a flowchart of operation of the system of FIG. 4D.

FIG. 4D demonstrates another method of defining the location of an object in the 3D space and specifically the location of the highlighted anchor point 440Z in the physical space. The user is requested to touch with the tracker pointer, for example an edge of a cone 436, in the physical location of the highlighted anchor point 440Z. A tracker pointer is adjusted to the tracker, for example like a rod or a cone 436, are in a known length and placed in a known six-dimensional position on the tracker. For example, adjusting a physical cone 436 of a known length in a known location and orientation on the tracker of the tracking system, enable the exact position of the cone 436 edge to be continuously known. Then, present on the AR viewer screen a marking of current anchor point 440Z and ask the user to physically touch with the edge of cone 436 the same point on the actual physical surface of the physical object and touch the screen, or do other signal, to enable the calculation of the 3-dimensional location of this physical location of the anchor point within the tracking system's world coordinates. Once the three anchor points are positioned, the physical object's six-dimensional position in space within the tracking system's world coordinate can be calculated as described above.

Step 481 presents a screen with the current anchor highlighted and requests the user to touch this point on the physical object with the tracker's pointer (cone) edge and signal once done. Signaling can be done by touching the AR viewer screen, voice command or any other method.

Step 485, upon user signal received, retrieves the current tracker position and calculates the pointer edge three-dimensional position in space. This can be done as the relative position of the tracker pointer's edge relative to the tracker is known as length and exact position of adjustment are pre-defined. This can be also calculated by other tracker pointers that can be used to measure pointer edge's location and compare it to current tracker position.

In step 485, calculated pointer edge location is recorded for future use.

A System with a Static Viewer and a Movable Object
System Layout

Figure 5A:
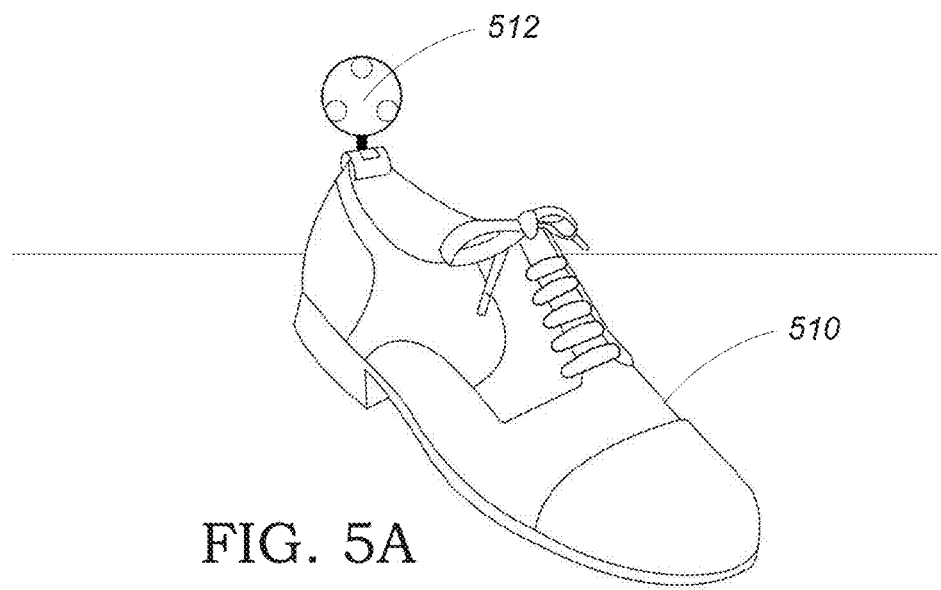
FIGS. 5A-5D illustrate use of a system having a static augmented reality viewer with a movable physical object.

FIGS. 5A-5D illustrate a scenario where an augmented reality viewer is static, while an inspected physical object is movable. FIG. 5A depicts a shoe 510 that represents a physical object to be viewed via a static augmented reality viewer. The user is expected to hold the shoe and freely move and manipulate it within the field of view of the camera of the static viewer, often arbitrarily hiding parts of the shoe, which renders unreliable conventional tracking of visual features of the shoe via the camera of the augmented reality viewer. Therefore, tracker 512 is rigidly fixed to the shoe, in a known six-dimensional position on the moving object, to allow continuous tracking of the absolute position of shoe 510 within a setup such as that of FIG. 3A. Another method of positioning is to place the physical moveable object in a resting position without moving it and initially position it with methods like described in FIGS. 4A-E or others, also possibly with the tracker placed at this stage on the static AR viewer, and once done place a tracker on the physical movable object, if not already attached to it, and then signal the system. Once done you can move again the moveable object, in this case the shoe 510 so any change in the shoe 510 position will cause the same change in the tracker 512 position that will be detected and thus enable to obtain also the new position of shoe 510.

Figure 5B:
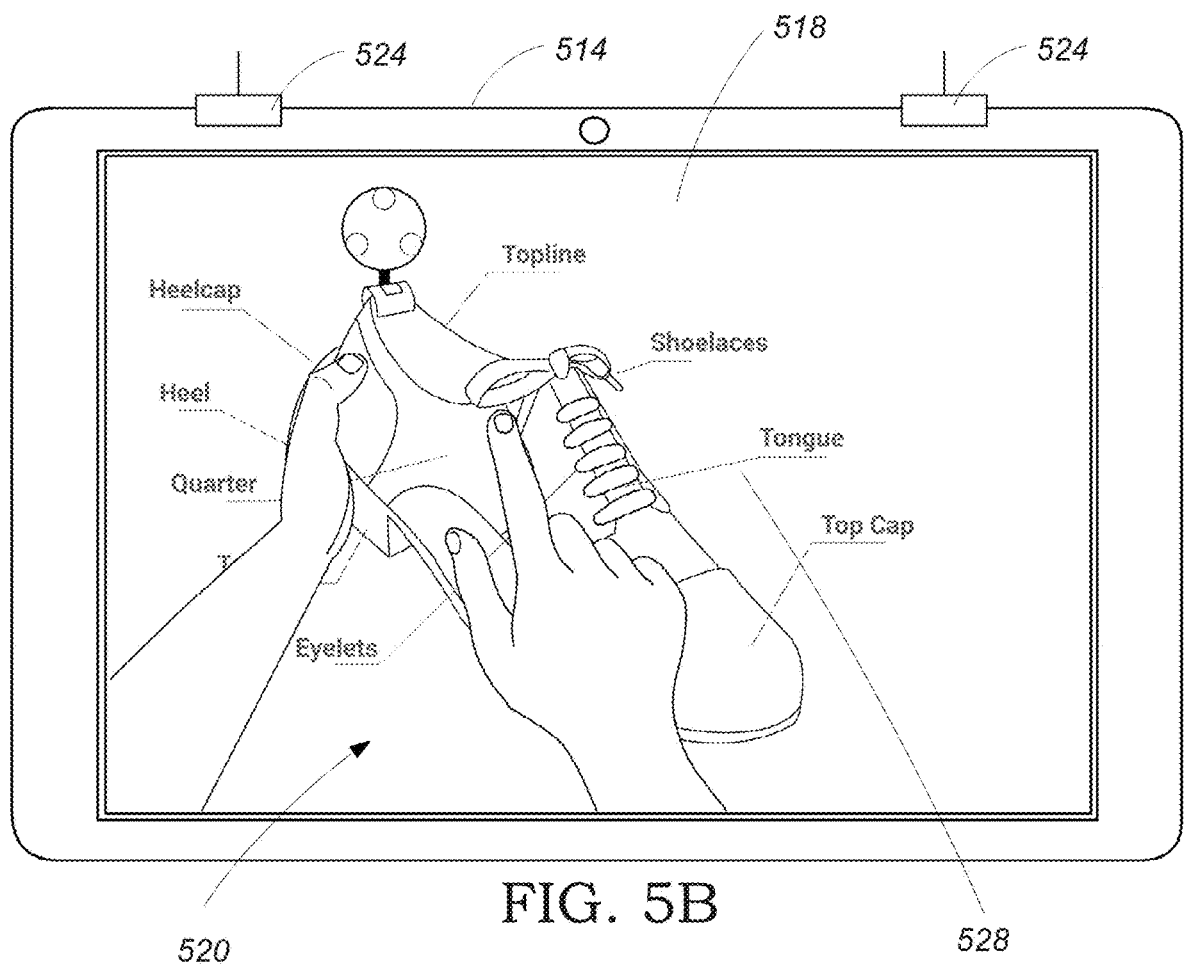
Figure 5C:
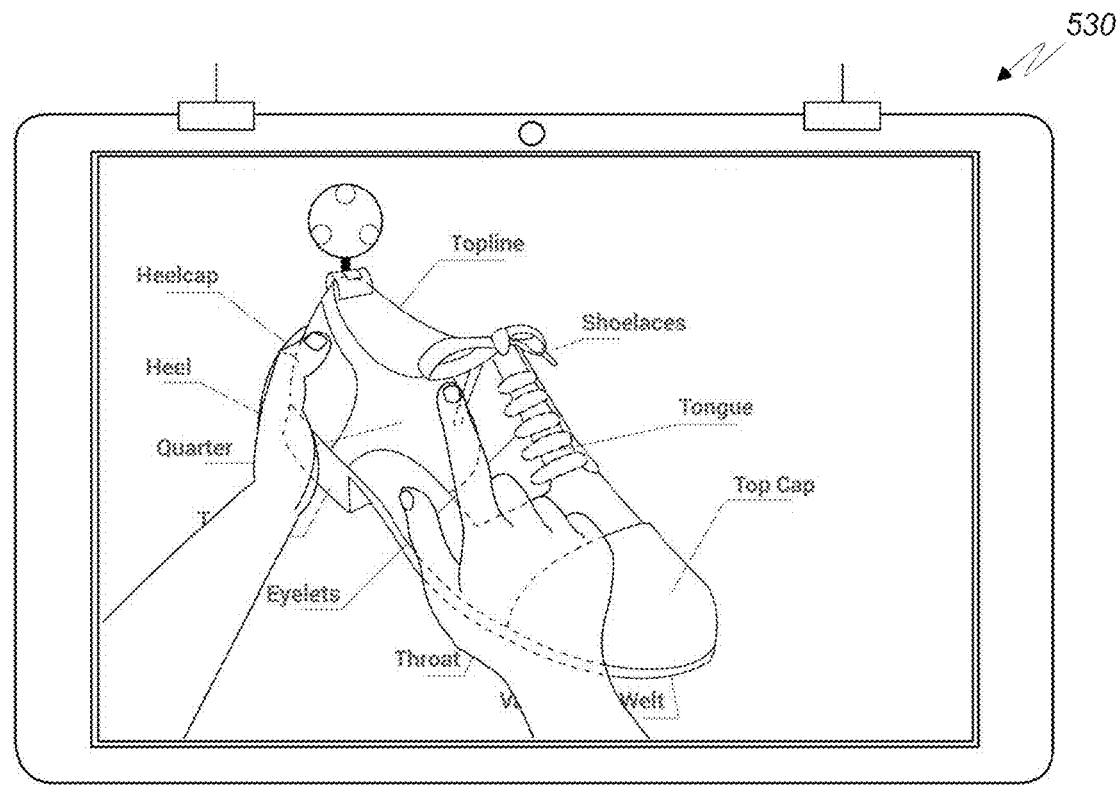

FIG. 5B depicts an augmented reality viewer 514 kept static at a fixed position by one or more of support 524, which is any conventional fixing device. The user, who holds shoe 510, sees on screen 518 a picture 520 that shows the shoe and hands as currently captured by the camera (not shown) of augmented reality viewer 514, and a layer of virtual object 528, which, in the present example, is embodied by pointers and text naming the various parts of the shoe. FIG. 5C depicts alternative embodiment 530, where the augmented reality logic provides a see-through feature so that parts of the shoe that have previously been captured by the camera but are currently hidden by the hand, are shown by dotted lines on top of the hand while in the alternative of 5B they are just not shown. The hands position can be calculated by visual analysis of the camera feed or by specialized accessories that are specialized in hands detection and tracking, for example Leap Motion™ (not shown) that are adjusted to the AR viewer and given the offset between their sensor and the AR Viewer's camera and their field of views, it enable the calculation of the areas on the 2D screen that are covered by the hands. Same methods can apply also if the AR viewer is moving, as long as the offset in position between the hand detecting sensors and the AR viewer's camera is fixed or known.

Figure 5D:
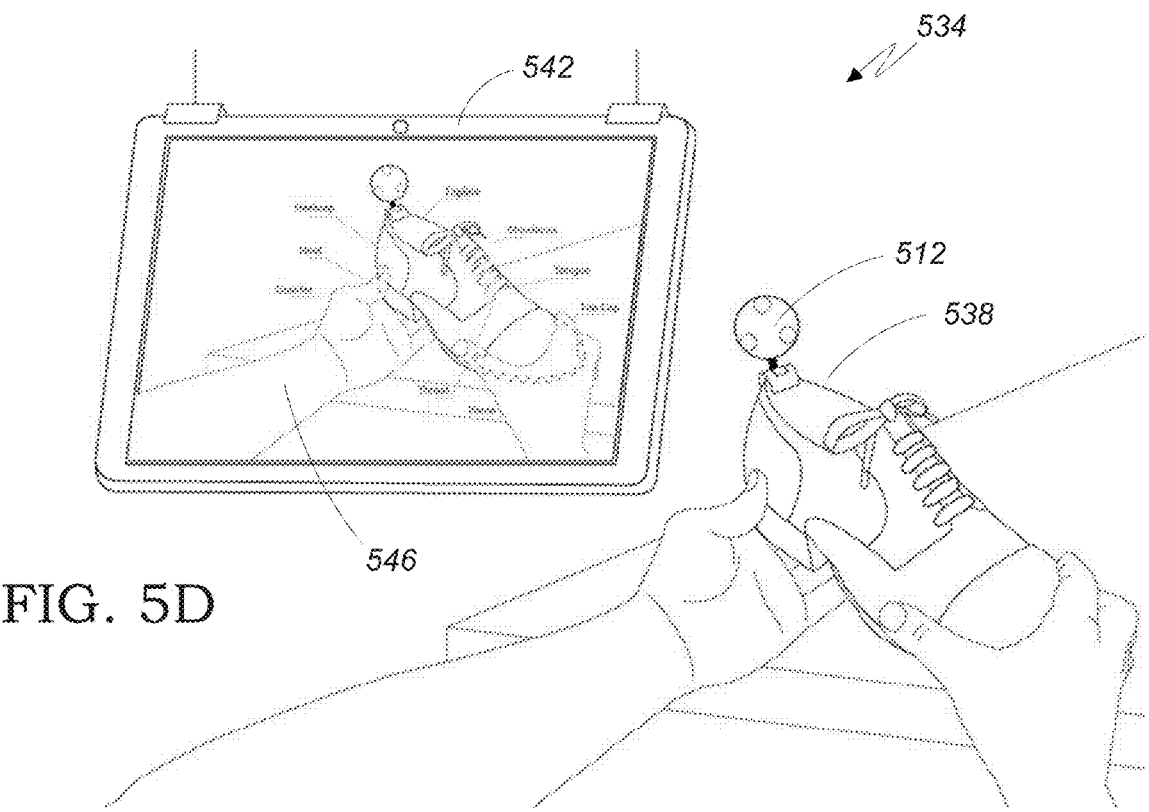

FIG. 5D illustrates scenario 534 that includes both shoe 538 and its augmented reality picture 546 on the screen of augmented reality viewer 542. The tracker 512 can be connected by wire or wirelessly to the AR viewer.

Operation

The following operation is performed by processors of the augmented reality viewer and/or processors of other computers optionally added to support real-time computing.

Figure 5E:
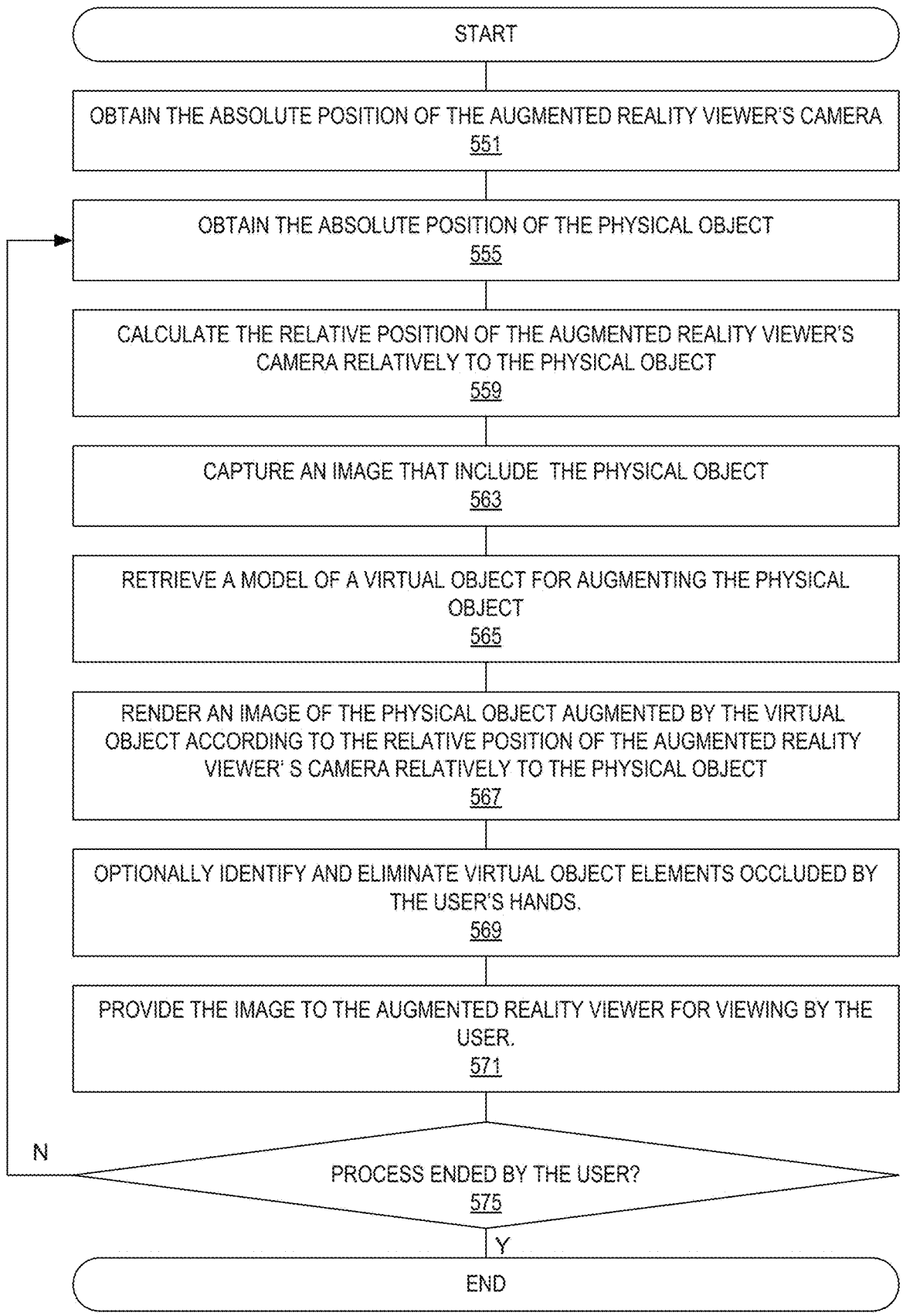
FIG. 5E is a flowchart of operation of the system of FIG. 5A.

FIG. 5E depicts the system operation for the embodiment of FIG. 5D, where augmented reality viewer 542 is at a fixed position. In step 551, the six-dimensional position of augmented reality viewer's camera 542 is obtained, for example by one of three methods: (a) since augmented reality viewer 542 is static, its position may have been previously determined and recorded, and now just retrieved from memory; (b) any conventional position measurement system is employed for measuring the position of augmented reality viewer 542; or (c) a method such as using the tracker pointer or other methods similar to those used to identify the anchor points but reverse, so the physical object is moving rather than the AR viewer. In step 555, the AR viewer is using tracker 512 and a corresponding tracking base, such as tracking base 320 of FIG. 3A, obtain the current absolute position of the tracker and derive from the known six-dimensional offset the six-dimensional position of the physical object (shoe 538), for example according to the background art teachings of FIG. 2A or 2B. In step 559, the absolute position of the physical object obtained in step 555 and the absolute position of the augmented reality viewer's camera obtained in step 551 are used to determine the relative position of the augmented reality viewer's camera relatively to the physical object. In step 563, the camera of the augmented reality viewer captures an image of the physical object. In step 565, a model of a virtual object, such as the pointers and text of FIGS. 5B+5C, is retrieved from memory, and step 567 renders an image of the physical object, augmented by the virtual object according to the current relative position of the augmented reality viewer's camera relatively to the physical object calculated in step 559. Such rendering and related calculations are made by methods known is the art of augmented reality, as also discussed with reference to FIGS. 1A-1C, 3A-3B and 4A-4E. In optional step 569, elements of the virtual object that pertain to features of the physical object currently occluded by the user's hand or other identified objects, are selectively eliminated from the rendered image by using visual analysis of the camera feed or using specialized accessories for hand detection and tracking as described above or other known methods used to identify objects and their positions. In step 571, the image rendered in steps 567+ optional 569 is provided to the screen of the augmented reality viewer for viewing by the user. If the user continues to operate the viewer, possibly moving the physical object (shoe 538), then step 575 sends the process back to step 555 and provide another picture from the current perspective in step 571.

A System with a Movable Viewer and a Movable Object

FIGS. 3A-3B related to a scenario of a static physical object and a movable augmented reality viewer; FIGS. 5A-5D related to a scenario of a movable physical object and a static augmented reality viewer. A third scenario is where both the physical object and augmented reality viewer are movable, in which case a tracker is attached to both the physical object and the augmented reality viewer.

Figure 6:
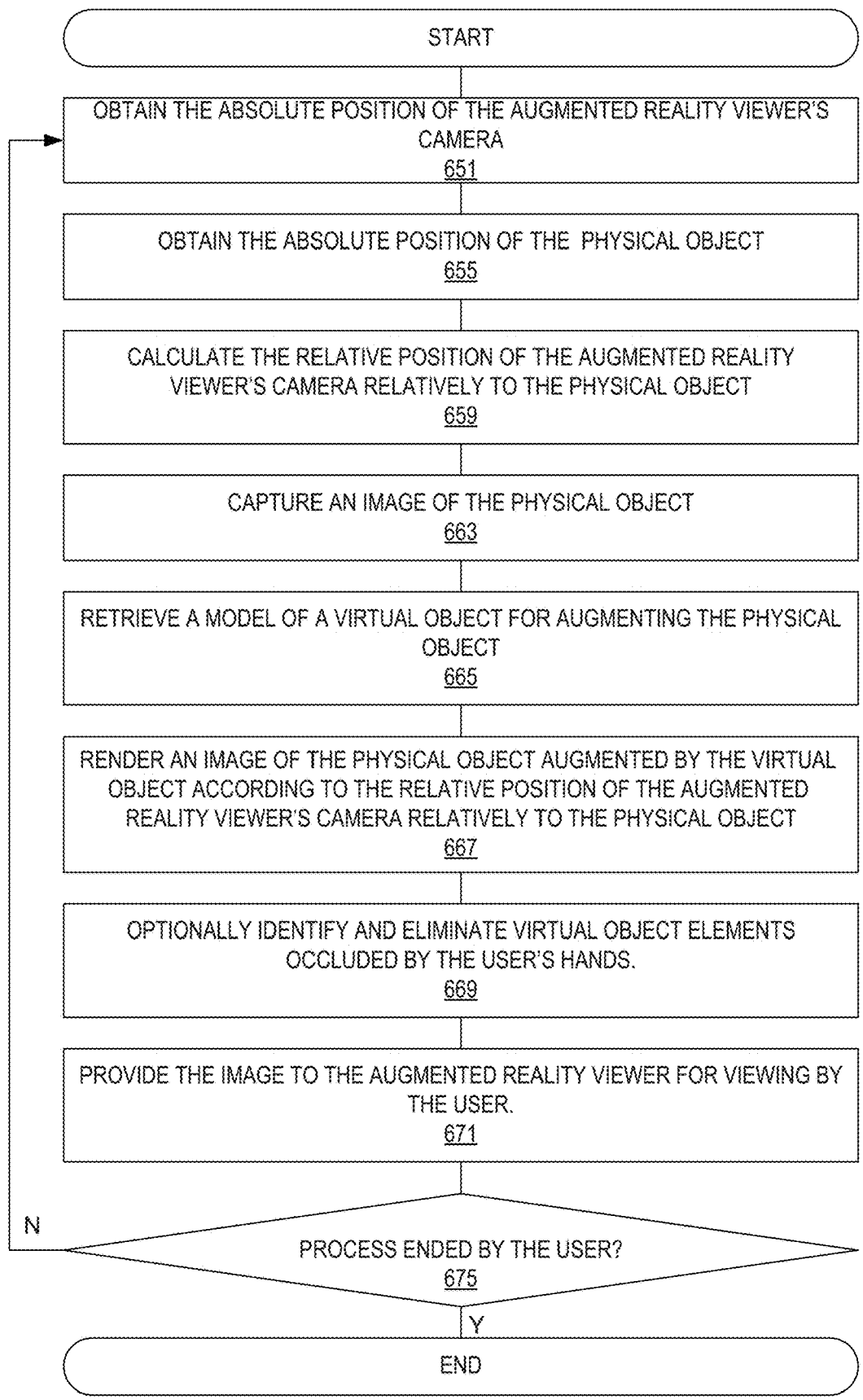
FIG. 6 is a flowchart of operation of a system having a physical object and an augmented reality viewer which are both movable.

FIG. 6 depicts the system operation for an embodiment where both the physical object and augmented reality viewer are movable by the user, and are therefore equipped with trackers that use a tracking base system to determine the absolute position of the object and viewer's camera, respectively based on the known offset between the tracker and the camera and the known six-dimensional location of the tracker on the physical object, respectively. The six-dimensional position offset of the tracker from the physical object can be obtained by accurate positioning of the tracker on exact six dimensional position on the physical object or indirectly by finding the absolute position of the physical object once resting in methods like describe in FIGS. 4A-E or other methods and then once done signal the system and then use the tracker to track any change in position. In step 651, the absolute position of augmented reality viewer's 542 camera is obtained via tracker-tracking base communication. In step 655, the absolute position of the physical object is obtained via tracker as described above. In step 659, the absolute position of the physical object obtained in step 655 and the absolute position of the augmented reality viewer's camera obtained in step 651 used to determine the relative position of the augmented reality viewer's camera relatively to the physical object. In step 663, the camera of the augmented reality viewer captures an image with the physical object in its field of view. In step 665, a model of a virtual object, such as the pointers and text of FIGS. 5B+5C, is retrieved from memory, and step 667 renders an image of the physical object, augmented by the virtual object according to the current relative position of the augmented reality viewer's camera relatively to the physical object calculated in step 659. Such rendering is made by methods known in the art of augmented reality, as also discussed with reference to FIGS. 1A-1C, 3A-3B and 4A-4E. In OPTIONAL step 669, elements of the virtual object that pertain to features of the physical object currently occluded by the user's hand, or other detectable objects, are selectively eliminated from the rendered image by using visual analysis of the camera feed or using specialized accessories for hand detection and tracking as described above. In step 671, the image rendered in steps 667+ optionally 669 is provided to the screen of the augmented reality viewer for viewing by the user. If the user continues to operate the viewer, possibly moving the physical object and/or the augmented reality viewer, then step 675 sends the process back to step 651, to provide another picture from the current perspective in step 671.

Figure 7:
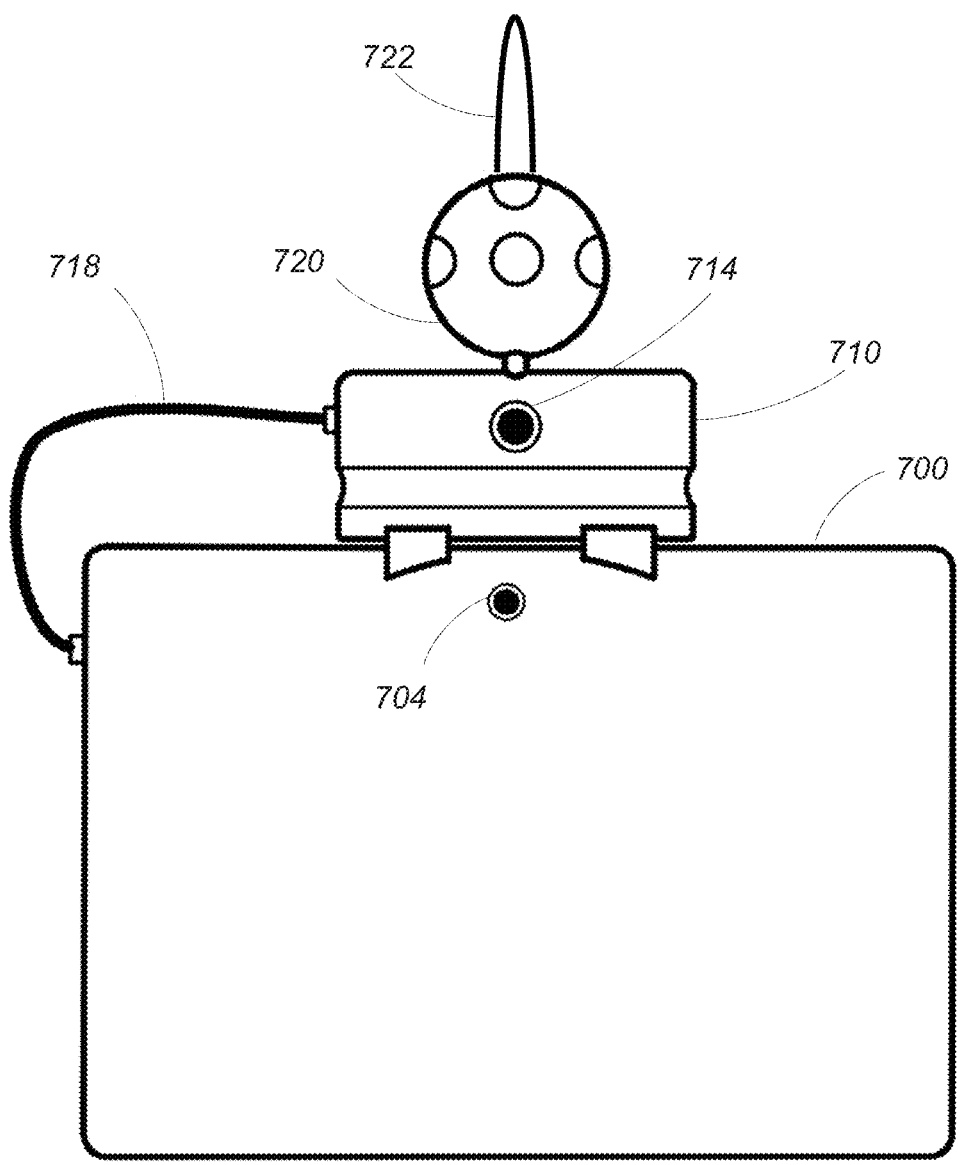
FIG. 7 illustrates different types of AR viewer's cameras.

FIG. 7 depict different types of AR viewer's cameras. One option is to use the device's back camera 704. In such a case, the accurate six-dimensional offset of the camera and the tracker 720 should be acquired by standard methods or by using other tracker (not shown) to obtain exact position of the back camera. The orientation of the back camera 704 and the AR viewer device 700 and the tracker 720 are often aligned, enabling in this case a quick identification of the back camera's 704 three-dimensional location in space by another tracker (not shown) or other methods and calculate the offset of the back camera 704 from the tracker 720 thus enabling to infer the back camera 704 six-dimensional absolute offset from the tracker 720 absolute position.

FIG. 7 also depict another use case in which a standalone camera 714 is assembled together in an integrating case 710 with tracker 720 that has a known fix six-dimensional offset from the standalone camera 714 enabling to calculate camera 714 position from the tracker 720 position. The standalone camera 714 might be connected to the device 700 thru a USB cord 718 while a USB hub (not shown) inside the case 710 can enable to connect both tracker 720 and standalone camera 714 to the device 700 using the same USB cord 718. The system also includes an object similar to a short rod that is used as a tracker pointer 722. The tracker pointer 722 is in a known length and placed in a known position on tracker 720 so the exact six dimensional position of the rode 722 edge is derived from the tracker 720 position. The tracker pointer 722 can be used to indicate 3D positions in space—for example touch an anchor point and generate a signal once touching a surface either by user indication, for example touching the screen, or automatically after some time of stable position of the rod edge or by sensor in the base of the tracker pointer 722 that may respond, for example, to pressure derived from the rod contact.

Figure 8:
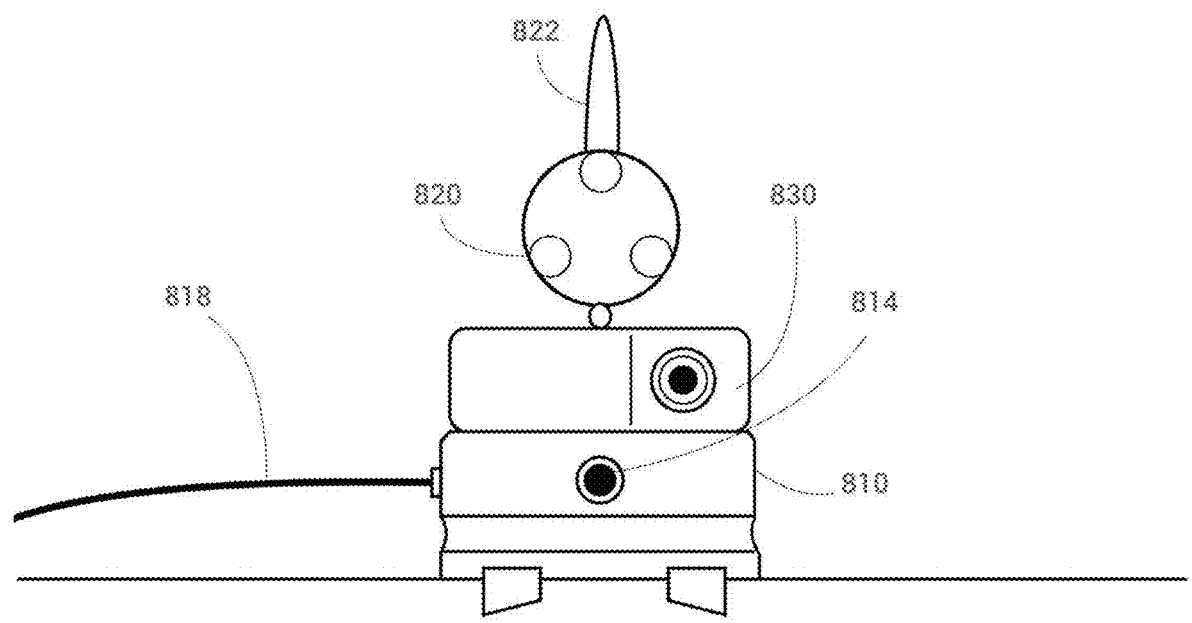
FIG. 8 illustrates another types of AR viewer that includes both a camera and a projector.

FIG. 8 also depict another use case in which a projector 814 is also integrated in the case 810 together with a camera 830, a tracker 820, a tracker's pointer 822 and a USB cable 818. As the exact six-dimensional position of the projector 814 lens relative to tracker 820 is known and defined by the case 810 structure and as the projector's model and field of view are also known then the exact position of the projector 814 lens can be calculated and then used to render and then project an AR image by the projector 814 on the surface of the physical object. One way to implement it is to use a 3D rendering engine like Unity3D and place a virtual camera in the same relative position to the virtual object as the Projector lens 814 position is relative to the physical object position and then render the image of a virtual object, enabling to align the two as the virtual object and the physical object are properly aligned in the same world coordinates, all based on similar methods as described in relation to generating an AR image and in relation to FIGS. 1A-1C, 3A-3B and 4A-4E, but referring to an image projected on the physical object rather than augmented on a camera feed on the screen, taking into consideration that, when not using AR goggles, only points on the surface of the physical object can be accurately projected. This virtual object might include points on the surface of the 3D model of the physical object and annotation marks thus enabling to highlight points on the physical object and add associated projected graphics.

Projection of images or videos on surfaces of the physical object that will keep their aspect ratio can be generated by calculating the angle of the surface related to the projector lens 814, using standard trigonometry to calculate the ratios in which the image should be scaled and rotated based on the AR viewer position in relation to the surface it projecting on.

Figure 9:
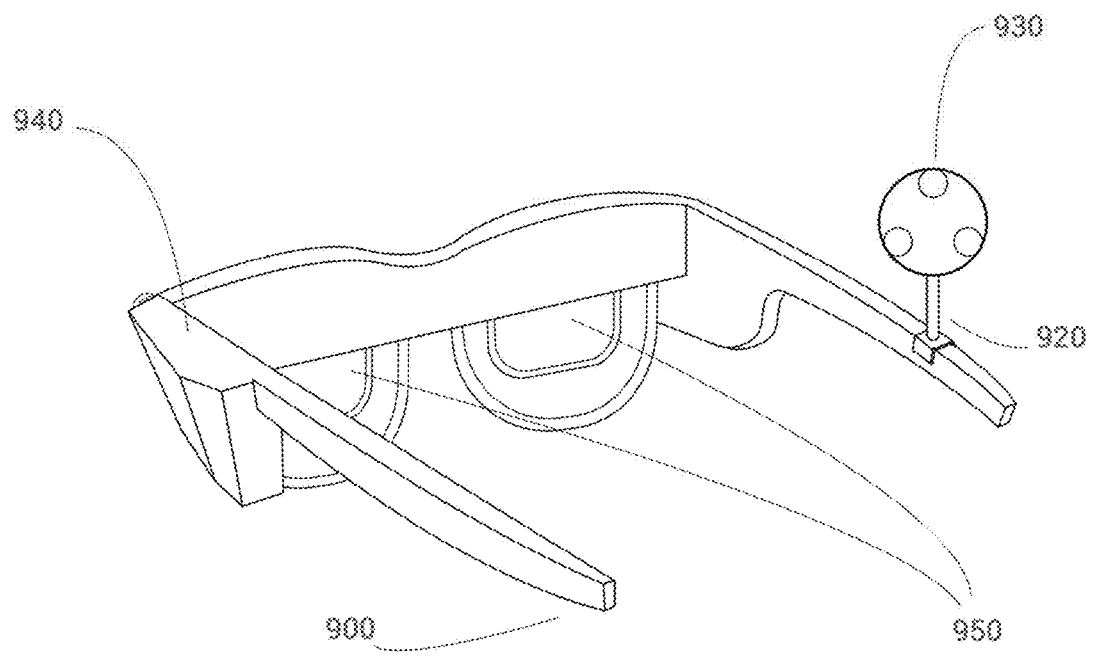
FIG. 9 illustrates a wearable AR device.

FIG. 9 show how to use the invention in the context of a wearable device, in this example a mixed reality goggles 900 that are using built-in micro projectors (not shown) to project images on the googles lens 950, one for each eye. Using a connector 920, the tracker 930 is fixed on a known six-dimensional position relative to the goggles lens 950, hence knowing the six-dimensional position of the tracker 930 enables to calculate the six-dimensional position of the goggles lens 950. This then enable to render the virtual object and supply the augmenting images, one for each lens 950, to be projected by projectors (not shown) on the googles lenses 950 adding the augmented layer on the reality as seen by the user's eyes (not shown) thru the lenses 950. The augmenting virtual object can include 3D models as well as text and annotations to be augmented over the physical object and its environment. One way to implement it is to use the methods described in FIGS. 1A-1C, 3A-3B and 4A-4E like using a 3D rendering engine to position two virtual cameras in the same relative positions to the virtual object as the googles lenses 950 positions are relative to the physical object and then render the images of a virtual object, enabling to align the two cameras as the virtual object and the physical object are properly aligned in the same world coordinates.

A System with Multiple Viewers and/or a Multiple Objects

Another scenario involves multiple movable and/or static physical objects and/or multiple movable and/or static augmented reality viewers. All movable physical objects and all movable augmented reality viewers are then equipped with trackers; and all object-tracker combinations are operated according to the respective figures from 3B, 5E and 6 above.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. An augmented reality system comprising:
a static tracking base station for sending signals; and
a movable unit operable by a user for augmenting a static physical object, the movable unit including:
a tracker for receiving signals sent by the static tracking base station,
a projector for projecting on the static physical object, and
at least one processor programmed to: (i) obtain a six-dimensional absolute position of the static physical object, (ii) calculate, from the signals received by the tracker, a six-dimensional absolute position of the projector, (iii) calculate, from the six-dimensional absolute position of the projector and the six-dimensional absolute position of the static physical object, a relative position of the projector relatively to the static physical object, (iv) receive a model of a virtual object for projection on the static physical object, (v) render an image of the virtual object according to the relative position of the projector relatively to the static physical object, and (vi) project the rendered image on the static physical object.

2. The augmented reality system of claim 1, wherein the static tracking base station comprises at least one lighthouse.

3. The augmented reality system of claim 1, wherein the obtain a six-dimensional absolute position of the static physical object includes receiving and processing user inputs.

4. An augmented reality method comprising:
obtaining a six-dimensional absolute position of a static physical object;
receiving in a movable unit that includes a projector signals from a static tracking base station;
calculating from the received signals a six-dimensional absolute position of the projector;
calculating, from the six-dimensional absolute position of the projector and the obtained six-dimensional absolute position of the static physical object, a relative position of the projector relatively to the static physical object;
receiving a model of a virtual object for projection on the static physical object;
rendering an image of the virtual object according to the relative position of the projector relatively to the static physical object; and
projecting the rendered image on the static physical object.

5. The augmented reality method of claim 4, wherein the obtaining a six-dimensional absolute position of the static physical object includes receiving and processing user inputs.

* * * * *